July 22, 1958 W. BERBERICH 2,843,878
APPARATUS FOR MANUFACTURING HELICAL WIRE
Filed Jan. 13, 1955 3 Sheets-Sheet 1

Inventor:
Willi Berberich
by: Michael S. Striker
agt.

July 22, 1958 W. BERBERICH 2,843,878
APPARATUS FOR MANUFACTURING HELICAL WIRE
Filed Jan. 13, 1955 3 Sheets-Sheet 2
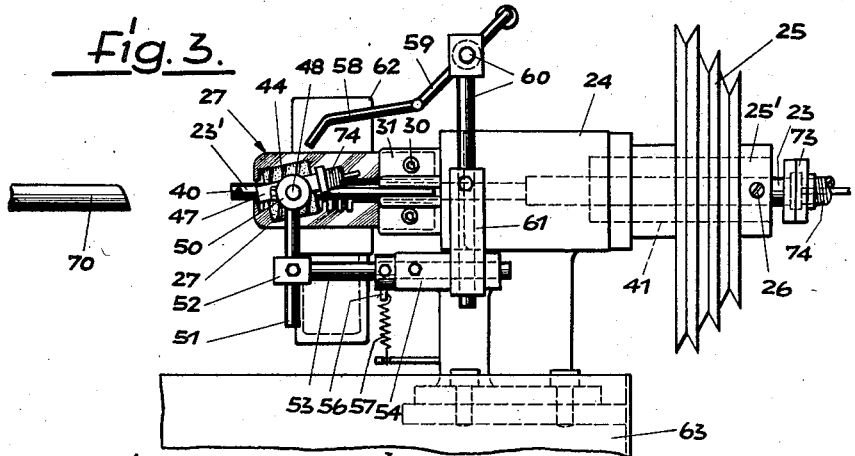
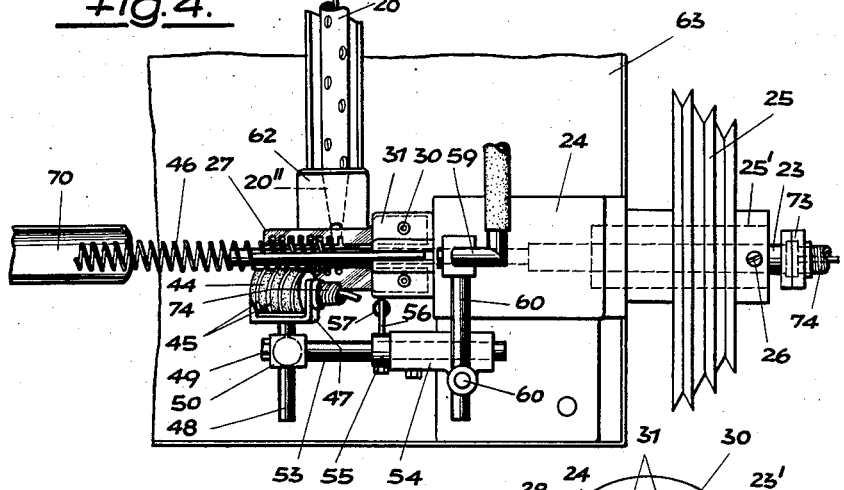
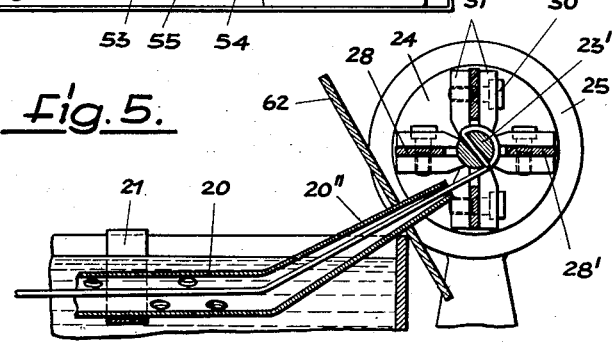
Inventor:
Willi Berberich
by: Michael S. Striker
agt.

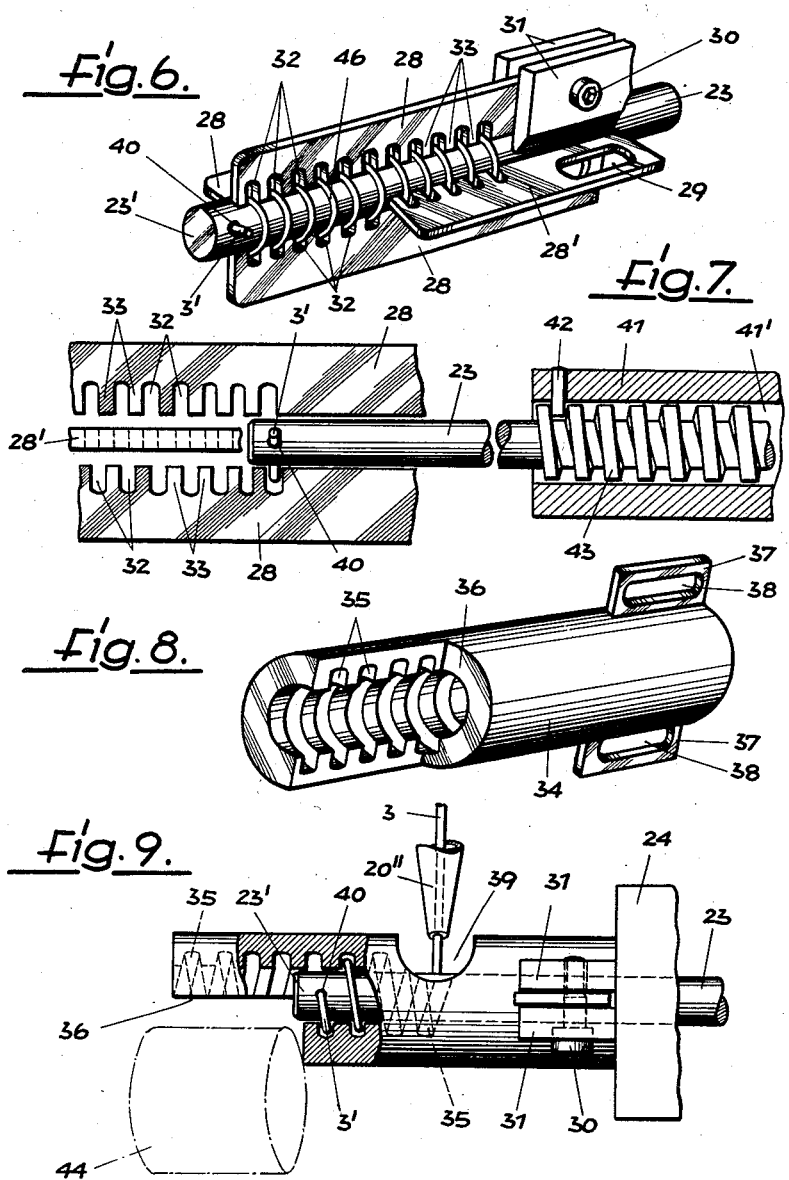

United States Patent Office 2,843,878
Patented July 22, 1958

2,843,878

APPARATUS FOR MANUFACTURING HELICAL WIRE

Willi Berberich, Heilbronn (Neckar), Germany

Application January 13, 1955, Serial No. 481,597

Claims priority, application Germany January 20, 1954

7 Claims. (Cl. 18—19)

The present invention relates to helical wires used in loose-leaf books and more particularly to apparatus for manufacturing such helical wires from a thermoplastic wire.

Although processes and apparatus are known at the present time for making such helical wires from a thermoplastic wire, the known processes require a great deal of labor and time and the known apparatus is extremely complicated. For example, it is conventional to wind the thermoplastic wire while it is cold into a helix and then, while maintaining the helical form of the wire, to insert the same in a heating medium such as hot water so that the wire will set in its helical shape after it is cooled, the wire finally being removed from the member on which it is wound. Such a conventional process and apparatus does not lend itself to continuous manufacture of the helical wire and has not proved to be satisfactory from a financial standpoint.

One of the objects of the present invention is to overcome the above drawbacks by providing an apparatus capable of continuously forming a helical wire in a simple, quick manner and at a cost which is far less than the cost of producing such wire according to conventional methods and with a conventional apparatus.

Another object of the present invention is to provide an apparatus which enables the helical wire to be continuously and automatically removed from the apparatus which makes the wire.

A further object of the present invention is to provide an apparatus of the above type with a minimum number of drives.

An additional object of the present invention is to provide an apparatus capable of continuously forming the wire at a fast rate which may, for example, be 16 meters per minute.

The present invention mainly consists of an apparatus for forming a helix from a thermoplastic wire, this apparatus including a support means for turnably supporting a reel carrying the thermoplastic wire. A container for hot water is carried by the support means, and a transporting means is carried by the support means for transporting the wire from the reel through the container. A spindle means is turnably carried by the support means for winding the wire onto the spindle means after the wire passes through the container. A guide means is located about the spindle means for guiding the wire wound on the spindle means along a helix of a given pitch, and a cooling means is carried by the support means for cooling the wire after it is formed into a helix.

The novel features which are considered as characteristic for the invention are set forth in particular in the appended claims. The invention itself, however, together with additional objects and advantages thereof, will be best understood from the following description of specific embodiments when read in connection with the accompanying drawings, in which:

Fig. 3 is a view, on an enlarged scale, of the upper part of the apparatus as seen from the right side of Figs. 1 and 2;

Fig. 4 is a fragmentary, top plan view of approximately the right half of the apparatus of Figs. 1 and 2;

Fig. 5 is a fragmentary, partly sectional, elevational view illustrating the manner in which the wire moves from a hot water bath onto a spindle where the wire is wound into a helix;

Fig. 6 is a fragmentary, perspective view of one possible structure for cooperating with a spindle to give the wire a curvature of a given pitch;

Fig. 7 is a fragmentary, partly schematic, elevational view illustrating a structure which controls the starting of the winding of the wire;

Fig. 8 is a perspective view of a second embodiment of a means for guiding the wire along a helix of a given pitch; and Fig. 9 is a partly sectional view illustrating the relationship between the guide means of Fig. 8 and the parts of the apparatus associated with this guide means as well as illustrating further details of the guide means.

Figure 1:
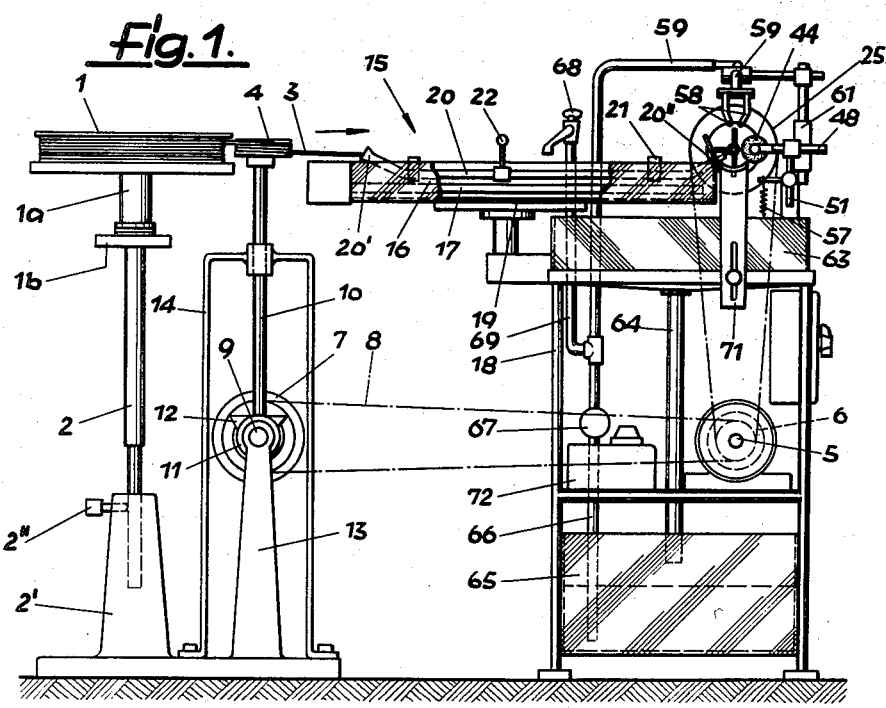
Fig. 1 is a partly broken away, partly schematic, side elevational view of an apparatus constructed in accordance with the present invention.
Figure 2:
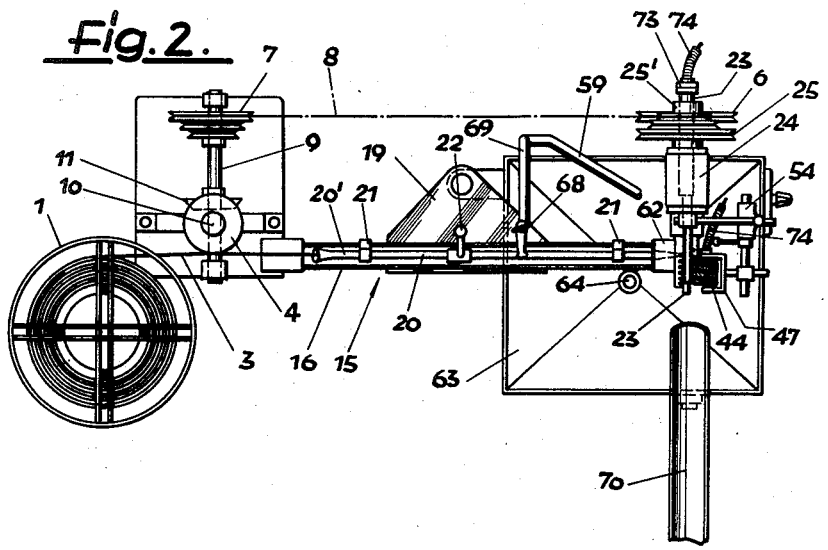
Fig. 2 is a top plan view of the apparatus of Fig. 1.

Referring now to the drawings, it will be seen from Figs. 1 and 2 that a reel 1 carrying the thermoplastic wire 3 is itself carried by the support means of the machine, this support means including the stand 2 which extends into a bore of a pedestal 2' and which may be adjusted in elevation by the set screw 2". The reel 1 is turnable on the stand 2, and for this purpose the stand 2 may extend into a tubular member 1a fixed to the bottom face of the reel 1, as viewed in Fig. 1, so that the tube 1a turns together with the reel 1 on the top end portion of the stand 2. A collar 1b is slidable along the length of the stand 2 and may be adjusted in elevation with any suitable set screw. This collar 1b is adjusted so as to frictionally engage the bottom face of the tubular portion 1a so as to brake the turning movement of the reel 1.

The wire 3, which may be any synthetic thermoplastic, extends from the reel 1 along a helical groove formed in the outer face of a cylindrical pulley 4 and from this pulley to the hot water bath 15. It is evident that the turns of the wire 3 about the pulley 4 and the location of the wire 3 in the helical groove of the pulley 4 will provide sufficient frictional engagement between wire 3 and pulley 4 to enable the wire to be advanced to the right, as shown by the arrow in Fig. 1, when the pulley 4 is rotated. This pulley 4 is driven from a main drive shaft 5 turnably carried by suitable bearings mounted on the frame 18 of the support means and driven by any suitable motor or the like (not shown). A stepped pulley 6 is fixed to the drive shaft 5 for rotation therewith, and a belt 8 extends from the pulley 6 to the pulley 7 which is fixed to the shaft 9 which is turnably carried by the pedestals 13 of the support means. The shaft 9 in turn drives a bevel gear 11 which meshes with a bevel gear 12 fixed to the shaft 10 which is turnable in a bearing of the frame 14 of the support means of the apparatus, and the pulley 4 is fixed to the top end of the shaft 10. In this way, the drive is transmitted from the shaft 5 to the pulley 4, and it is evident that the stepped pulley 6, which has the same construction as the stepped pulley 25 shown at the upper right portion of Fig. 2, and the stepped pulley 7 enable the speed of rotation of the pulley 4 to be regulated by shifting the belt 8 to different positions on the stepped pulleys 6 and 7.

As is evident from the above description, the pulley 4 transports the wire 3 to a hot water bath 15, and this hot water bath 15 includes a container 16 in the form of a relatively narrow channel open at its top and having closed ends. An electrical immersion heater 17 is located within the channel 16 to heat water located therein, and this immersion heater 17 is electrically connected through suitable leads (not shown) to a thermostat 72, carried by the frame 18, as shown in Fig. 1, so that with this thermostat it is possible to regulate the temperature of the water so that it is maintained approximately at 85° C. The channel 16 is carried by a support 19 which is in turn fixed to the frame 18 of the support means, and this support 19 may be adjusted on the frame 18 in any suitable way.

A perforated tube 20, through which the wire 3 is guided, is located within the container 16 beneath the surface of the water therein except for the entrance end 20' and exit end 20" of the tube 20, these open ends of the tube 20 being bent upwardly from the remainder of the tube and extending above the surface of the liquid in the container 16. The tube 20 is carried by clamps 21 which rest on an upper edge of the container 16 so that the tube 20 may be easily removed from and inserted into the container 16, a hand grip 22 being fixed to the tube 20 so that the operator may conveniently move the tube 20. Thus, it is evident that the wire 3 will be guided through the tube 20 along the heated liquid within the container 16 until the wire leaves the tube 20 through the exit end 20" thereof.

The tube 20 will guide the wire 3 along a predetermined path, and a spindle means 23 is carried by a stationary bearing 24 of the support means of the machine and extends in a direction normal to the path of movement of the wire through the tube 20. The bearing 24 is carried directly by the frame 18. The drive shaft 5 carries one of a pair of identical stepped pulleys 25 which is located beneath the other stepped pulley 25 which is fixed to the spindle 23, and a suitable belt extends between the pair of stepped pulleys 25 to transmit the drive from the shaft 5 to the spindle 23. The stepped pulley 25 through which the spindle 23 passes has a hub portion 25' through which a set screw 26 is threaded (Figs. 3 and 4) in order to place the upper pulley 25 in driving engagement with the spindle 23. The set screw 26 is provided so that by loosening of this set screw the drive between the upper pulley 25 and the spindle 23 may be disconnected so that the spindle 23 may be axially shifted with respect to the pulley 25 thereon, for a purpose described below. The spindle 23 is provided with a free end portion 23' extending across the outlet end 20" of the tube 20 and formed adjacent its extremity with a transverse bore 40 for a purpose described below. This free end portion of the spindle 23 is surrounded by a guide means 27 for guiding the wire which the spindle 23 winds upon itself along a helix of a given pitch.

The guide means 27 may be either the construction shown in Figs. 6 and 7 or the construction shown in Figs. 8 and 9. According to Figs. 6 and 7 this guide means includes several plates 28 and 28' respectively located in planes extending radially through the spindle means 23 and including the axis thereof. Actually, in the embodiment of Fig. 6, these plates are angularly spaced from each other by 90°. It will be noted that the plate 28' terminates short of the plates 28 so as to provide an exposed portion of the spindle means 23 at one side thereof. As is evident from Fig. 6, each of these plates is provided with an elongated slot 29, and a screw 30 extends through each of these slots. Each of the screws 30 is turnably carried by a pair of plates 31, and the plates 28 and 28' respectively extend between the pairs of plates 31, as shown most clearly in Fig. 5, the screws 30 serving to draw the plates 31 together to clamp the plates 28 and 28' therebetween. The screws 30 have sufficient clearance in the slots 29, respectively, to enable the plates 28 and 28' to be shifted in their respective planes both axially and radially with respect to the spindle means 23. These plates 31, which serve to support the plates 28 and 28', are adjustably connected to the end face of bearing 24 which is nearest to the container 16, and the pairs of plate holding members 31 are radially adjustable along the bearing 24 through any suitable structure. For example, these holding members 31 may be mounted on the bearing 24 in the same way that the jaws of a chuck are mounted thereon for radial movement toward and away from the axis of the chuck. Each of the plates 28 and 28' has teeth 33 formed in its edge which is located adjacent and extends along the spindle means 23, and the gaps 32 between the teeth 33 of one plate 28 are staggered with respect to the gaps 32 of the next adjacent plate, and moreover, these gaps are all arranged along a helix having a desired pitch so that, as is evident from Fig. 6, when the spindle 23 turns with respect to the plates 28, the gaps 32 thereof will force the wire 3 to be formed into a helix 46 having a pitch which is controlled by the position of the plates 28 and 28'.

The second embodiment of the guide means 27, which is illustrated in Figs. 8 and 9, includes a sleeve 34 through which the spindle means 23 extends, this sleeve 34 having its inner surface located next to the spindle means and formed with a helical groove 35 having the pitch of the final curved wire, so that as the wire wound on the spindle 23 advances through the sleeve 34 the groove 35 thereof will give the wire a predetermined pitch. This sleeve 34 is provided with a portion on one side, corresponding to plate 28', which terminates at the end face 36 which is short of the termination of the sleeve 34 on the opposite side of the spindle from the end face 36, so that in this way the spindle is exposed on one side of the sleeve 34. Furthermore, the sleeve 34 has radially extending fins 37 fixed thereto and extending therefrom and formed with elongated slots 38 so that these fins 37 may be located respectively between pairs of holding plates 31 with the screws 30 extending through the slots 38 to fix the sleeve 34 to the bearing 24 in the same way that the plates 28 and 28' are fixed to the bearing 24. Also, as is evident from Fig. 9, the sleeve 34 is formed with an opening 39 through which the wire issuing from the end 20" of the tube 20 enters into the sleeve 34 to be wound about the spindle means 23.

With regard to the guiding of the wire 3 through the guide means 27 which controls the pitch of the wire and with regard to the winding of the wire 3 onto the spindle means 23, there are two different conditions which must be taken under consideration, namely, the condition involved when the process and apparatus of the invention is first started and the condition which obtains after the process and apparatus is started and during the continuous operation thereof.

When the process is started, the screw 26 is loosened and the spindle means 23 is shifted to the right, as viewed in Figs. 3 and 4, with respect to the bearing 24, and the pulley 25 through which the spindle means 23 extends, so that the transverse bore 40 adjacent the extremity of the free end portion 23' of the spindle 23 is located opposite the outlet end 20" of the perforated tube 20. This will locate the extremity of the free end portion 23' of the spindle adjacent the starting end of the teeth 33 of the plates 28 and 28' or adjacent the starting end of the groove 35, these starting ends being located at the right end of the group of teeth 33, as viewed in Fig. 6, and at the right end of the groove 35, as viewed in Fig. 8. The end portion 3' of the wire which first issues from the tube 20 is manually passed through the bore 40 of the spindle so that the wire 3 is compelled in this way to participate in the axial and rotational movement of the spindle means 23. This spindle means is then turned by hand and advanced along its axis to the left, as viewed in Figs. 6 and 9 so that the combined axial and rotational movement of the spindle causes the wire 3 to be threaded along a helix passing through the gaps 32 between the teeth 33 or along the helix defined by the groove 35. In this way, the wire 3 which has been softened by the heating thereof in the hot water bath 15 is easily formed into a helix having the desired pitch.

Although it is possible to perform the starting operation in the above-described manner by hand, since the plates 28 and 28', or the sleeve 34, will compel the wire to be formed along a helix of the desired pitch, it may be desirable under certain circumstances to provide a further assurance that the spindle 23 is turned and advanced properly at the start of the operation, and for this purpose the spindle 23 may be provided between the guide means 27 and the pulley 25 carried by the spindle 23 with a screw portion 43 shown in Fig. 7, this screw portion 43 defining a helix of the desired pitch. A tube 41 is fixed to the support means and the spindle means 23 extends through the tube 41, which is located between the pulley 25 carried by the spindle 23 and the guide means 27, for example, within the bearing 24 to which the tube 41 is fixed. A pin 42 is fixed to the tube 41 and extends into the groove defined by the screw 43 which is fixed to and forms part of the spindle means 23, this screw 43 being located within the interior 41' of the tube 41 in the starting position of the spindle means 23 illustrated in Fig. 7. The length and position of the screw 43 is such that when the spindle 23 has been turned and advanced sufficiently to locate the screw 43 beyond the pin 42 to the left thereof, as viewed in Fig. 7, the bore 40 of the spindle 23 will have been located beyond the guide means 27, for example, in the position shown in Fig. 6 where this bore 40 is located to the left beyond the plates 28. Thus, with the arrangement of Fig. 7, when the operator turns the spindle 23 the screw 43 will compel the spindle 23 to be rotated and advanced at the required rate for producing a helix of desired pitch.

When the starting end 3' of the wire 3 has been located beyond the guide means 27, in the manner described above, the starting end 3' is removed from the transverse bore 40 since the starting operation has ended, the wire 3 being helically wound about the spindle 23 and threaded through the guide means 27 at this time. Now, the continuous winding of the helix commences, and for this purpose the pulley 25 through which the spindle 23 extends is fixed to the spindle 23 with the set screw 26. The driving speed is such that, for example, 16 meters of finished helical wire is produced in one minute. In order to provide a means for guaranteeing that the wire 3, whose end 3' is no longer in the bore 40, turns with the spindle 23, a friction roller 44 is provided, and this friction roller 44 is cylindrical and formed in its outer surface with a helical groove 45 having the pitch of the finished wire 46. This friction roller 44 is resiliently pressed toward the spindle 23, in a manner described below, at the exposed portion of the spindle 23 provided by the shorter plate 28' or the end face 36 which terminates short of the left end of the sleeve 34, as viewed in Fig. 8.

Under certain circumstances, particularly when the helix has a small diameter, it is desirable to drive the friction roller 44, and in this case the roller 44 is connected to a flexible drive shaft 74 which extends from the roller 44 to one of a pair of friction clutch discs 73 turnably carried by the right free end of the spindle 23, as viewed in Figs. 3 and 4, the end portions of the flexible drive shaft 74 being shown most clearly in Fig. 2. The slip clutch 73 has its left disc, as viewed in Figs. 3 and 4, fixed to the spindle 23 for rotation therewith so that a drive is transmitted from the shaft 23 through the slip clutch 73 and flexible drive shaft 74 to the roller 44. The roller 44 turns at a somewhat lower speed than the spindle 23 and the slip clutch 73 takes care of differences between these speeds of rotation.

The roller 44 is turnably supported between the legs of a U-shaped member 47 which is fixed to a shaft 48 extending through a bore of a block 50 and fixed to the latter by the set screw 49. The block 50 is in turn carried by a shaft 51 which extends through an opening of a block 52 and which is fixed to this block 52 by a set screw. The block 52 in turn is carried by the horizontal shaft 53, shown in Fig. 3, and this shaft 53 extends through the stationary bearing 54 which is supported by the frame 18. Suitable collars fixed to the shaft 53 and located at the ends of bearing 54 allow the shaft 53 to turn in the bearing 54 and prevent the shaft 53 from moving axially along the bearing 54. A lever 56 is fixed to and extends from one of these collars, and a spring 57 is connected at one end to the lever 56 and at its opposite end to a pin which is fixed to and extends from a stationary part of the support means, as shown in Fig. 3. This spring 57 pulls downwardly on the lever 56, as viewed in Figs. 1 and 3, so that the roller 44 is urged in a counterclockwise direction, as viewed in Fig. 1, toward the spindle, and in this way the roller 44 is resiliently urged towards the exposed portion of the spindle means 23. The friction roller 44 into whose helical groove 45 the wire 46 extends prevents slip between the wire 46 and the spindle 23 so that in this way the wire is compelled to turn with the spindle 23 while advancing therealong.

A means is provided to cool the wire, which has been heated by the bath 15, this cooling taking place at the region where the friction roller 44 cooperates with the spindle 23. This cooling means takes the form of a liquid guiding means in the form of conduits 59 having a pair of outlets 58 (Fig. 1) which direct a cooling liquid onto the wire wound about the spindle 23 in the region of the friction roller 44. The conduits 59 are preferably carried by the interconnected elements 60 (Fig. 3) one of which extends through a sleeve 61 fixed to a side of the bearing 54, so that with a set screw which extends through the sleeve 61 it is possible to adjust the elevation of the elements 60 and the conduits 59 carried thereby. A baffle 62, formed with an opening through which the end portion 20'' of tube 20 extends, is carried by this tube 20 and is located adjacent the right end of channel 16, as viewed in Fig. 2, to guide the cooling liquid which falls from the curved wire into a collecting pan 63 carried by the frame 18. This collecting pan is provided at its central lowermost portion with an outlet tube 64 which guides the cooling water into a tank 65. The liquid guiding means 59 extends into the tank 65 and carries a pump 67 so that this pump may pump the liquid from the tank 65 to the outlets 58 from which the liquid falls to the pan 63 to move from the latter through the tube 64 back into the tank 65. The cooling water which has been heated by engagement with the curved wire 46 cools off in the pan 63 and in the tank 65. A branch 69 communicates with the conduit 59 and has an outlet end over the container 16, this branch 69 being provided with a manually operable valve 68 which allows water from the tank 65 to be used to fill the container 16, this water being subsequently heated by the immersion heater 17 in the manner described above.

A bracket 71 (Fig. 1) is formed with a slot through which a screw threadedly connected to the frame 18 extends so that the elevation of the bracket 71 may be regulated, and this bracket 71 carries at its top end a trough 70 (Figs. 2–4) into and along which the finished wire 46 moves after it leaves the spindle means 23. This trough 70 continuously guides the helical wire 46 to a machine for making loose-leaf books, for example, and at the machine the wire 46 is cut into lengths suitable for use in loose-leaf books.

It is possible with the structure of the invention to form helical wires of different diameters and different pitches. If the diameter of the helical wire is to be changed, then when the guide means 27 includes the plates 28 and 28' of Figs. 6 and 7, it is only necessary to adjust these plates radially, while when the guide means 27 takes the form of the sleeve 34, one sleeve 34 of a given inner diameter must be exchanged for a different sleeve 34 having a different inner diameter, and of course the spindle 23 is exchanged for a different spindle having a different diameter. When the pitch is to be changed then it is necessary to change the guide means 27 whether this guide means takes the form shown in Figs. 6 and 7 or that shown in Figs. 7 and 8. The stepped pulleys 25 are provided to provide different speeds of rotation in accordance with the particular diameter of the helix being manufactured.

It will be understood that each of the elements described above, or two or more together, may also find a useful application in other types of process and apparatus for forming helical wires differing from the types described above.

While the invention has been illustrated and described as embodied in apparatus for continuously forming helical wires of thermoplastic material to be used in loose-leaf books, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Apparatus for making a helix from a thermoplastic wire, comprising, in combination, support means for turnably supporting a reel carrying the thermoplastic wire; a container for hot water carried by said support means; transporting means between said reel and said container carried by said support means for transporting the wire from the reel through said container; spindle means turnably carried by said support means for winding the wire onto said spindle means after the wire passes through said container; guide means located about said spindle means for guiding the wire wound on said spindle means along a helix of a given pitch, said guide means terminating on one side of said spindle means short of the end of said guide means on the other side of said spindle means to expose a portion of said spindle means at said one side thereof; a friction roller located next to said exposed portion of said spindle means and formed in its outer surface with a helical groove having said given pitch; means operatively connected to said friction roller for turnably supporting and urging the same toward said exposed portion of said spindle means so that a wire on the latter will be engaged by said roller and advanced, by rotation of the same, along said spindle means; and drive means connected to said roller for driving the same.

2. Apparatus for making a helix from a thermoplastic wire, comprising, in combination, support means for turnably supporting a reel carrying the thermoplastic wire; a container for hot water carried by said support means; transporting means carried by said support means for transporting the wire from the reel through said container; spindle means turnably carried by said support means for winding the wire onto said spindle means after the wire passes through said container; and guide means located about said spindle means for guiding the wire wound on said spindle means along a helix of a given pitch, said guide means including a plurality of plates respectively arranged in planes respectively passing radially through said spindle means and including the axis thereof, said plates each having a toothed edge portion located next to and extending along said spindle means and the gaps between the teeth of one of said plates being staggered with respect to the gaps between the teeth of the next adjacent plate and all of said gaps being arranged along said helix, one of the plates located on one side of said spindle means terminating short of the other of said plates to expose a portion of said spindle means at said one side thereof; a friction roller located next to said exposed portion of said spindle means and formed in its outer surface with a helical groove having said given pitch; means operatively connected to said friction roller for turnably supporting and urging the same toward said exposed portion of said spindle means so that a wire on the latter will be engaged by said roller and advanced, by rotation of the same, along said spindle means; and drive means connected to said roller for driving the same.

3. Apparatus for making a helix from a thermoplastic wire, comprising, in combination, support means for turnably supporting a reel carrying the thermoplastic wire; a container for hot water carried by said support means; transporting means carried by said support means for transporting the wire from the reel through said container; spindle means turnably carried by said support means for winding the wire onto said spindle means after the wire passes through said container; and guide means located about said spindle means for guiding the wire wound on said spindle means along a helix of a given pitch, said guide means including a plurality of plates respectively arranged in planes respectively passing radially through said spindle means and including the axis thereof, said plates each having a toothed edge portion located next to and extending along said spindle means and the gaps between the teeth of one of said plates being staggered with respect to the gaps between the teeth of the next adjacent plate and all of said gaps being arranged along said helix, and said guide means including a means for adjustably supporting said plates for respective movement in said planes for adjusting the position of said plates relative to each other so that helixes of different pitch may be formed with the same plates.

4. Apparatus for making a helix from a thermoplastic wire, comprising, in combination, support means for turnably supporting a reel carrying the thermoplastic wire; a container for hot water carried by said support means; transporting means carried by said support means for transporting the wire from the reel through said container; spindle means turnably carried by said support means for winding the wire onto said spindle means after the wire passes through said container; and guide means located about said spindle means for guiding the wire wound on said spindle means along a helix of a given pitch, said guide means including a sleeve through which said spindle means extends, said sleeve having an inner surface located next to said spindle means and formed with a helical groove having said given pitch, and said sleeve also being formed with an opening through which the wire passes to said spindle means, said sleeve terminating on one side of said spindle means short of the end of said sleeve on the other side of said spindle means to expose a portion of said spindle means at said one side thereof; a friction roller located next to said exposed portion of said spindle means and formed in its outer surface with a helical groove having said given pitch; means operatively connected to said friction roller for turnably supporting and urging the same toward said exposed portion of said spindle means so that a wire on the latter will be engaged by said roller and advanced by rotation of the same, along said spindle means; and drive means connected to said roller for driving the same.

5. Apparatus for making a helix from a thermoplastic wire, comprising, in combination, support means for turnably supporting a reel carrying the thermoplastic wire; a container for hot water carried by said support means; transporting means carried by said support means for transporting the wire from the reel through said container; spindle means carried by said support means for rotation thereon and for axial movement therealong, said spindle means having a free end portion formed adjacent its extremity with a transverse bore through which the wire is adapted to extend to wind the wire initially on said spindle means; and guide means located about said free end portion of said spindle means and being stationary with respect to the same for guiding the wire wound on said spindle means along a helix of a given pitch.

6. Apparatus for making a helix from a thermoplastic wire, comprising, in combination, support means for turnably supporting a reel carrying the thermoplastic wire; a container for hot water carried by said support means; transporting means carried by said support means for transporting the wire from the reel through said container; spindle means carried by said support means for rotation thereon and for axial movement therealong, said spindle means having a free end portion formed adjacent its extremity with a transverse bore through which the wire is adapted to extend to wind the wire initially on said spindle means; guide means located about said free end portion of said spindle means and being stationary with respect to the same for guiding the wire wound on said spindle means along a helix of a given pitch; drive means operatively connected to said spindle means for rotating the latter; and means for releasing the driving connection between said drive means and spindle means when it is desired to shift said spindle means axially with respect to said drive means.

7. Apparatus for making a helix from a thermoplastic wire, comprising, in combination, support means for turnably supporting a reel carrying the thermoplastic wire; a container for hot water carried by said support means; transporting means carried by said support means for transporting the wire from the reel through said container; spindle means carried by said support means for rotation thereon and for axial movement therealong, said spindle means having a free end portion formed adjacent its extremity with a transverse bore through which the wire is adapted to extend to wind the wire initially on said spindle means; guide means located about said free end portion of said spindle means and being stationary with respect to the same for guiding the wire wound on said spindle means along a helix of a given pitch; drive means operatively connected to said spindle means for rotating the latter; means for releasing the driving connection between said drive means and spindle means when it is desired to shift said spindle means axially with respect to said drive means; a pin fixed to said support means and extending radially toward said spindle means at a portion thereof located between said guide means and drive means; and screw means forming part of said spindle means and located on the outer surface thereof between said guide means and drive means, said screw means defining a helical groove into which said pin extends and having a length which locates said bore of said spindle means beyond said guide means when said screw means advances beyond said pin.

References Cited in the file of this patent
UNITED STATES PATENTS

| | | |
|---|---|---|
| 2,108,023 | Salemme | Feb. 8, 1938 |
| 2,268,703 | Dickey | Jan. 6, 1942 |
| 2,363,826 | Yellin | Nov. 28, 1944 |
| 2,450,324 | Wilson et al. | Sept. 28, 1948 |
| 2,575,747 | Cook | Nov. 20, 1951 |